(12) United States Patent
Ponnambalam et al.

(10) Patent No.: US 8,387,135 B2
(45) Date of Patent: Feb. 26, 2013

(54) METHOD AND APPARATUS FOR MAXIMIZING CAPACITY OF ACCESS CONTROLLERS

(75) Inventors: Santhanakrishnan Ponnambalam, Tamil Nadu (IN); Sivakumar Balakrishnan, Tamil Nadu (IN); Gopalakrishnan Venkatesan, Tamil Nadu (IN); Venkatesh Viswanathan, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 612 days.

(21) Appl. No.: 12/348,628

(22) Filed: Jan. 5, 2009

(65) Prior Publication Data

US 2010/0175127 A1 Jul. 8, 2010

(51) Int. Cl.
*G06F 21/00* (2006.01)
(52) U.S. Cl. .................. 726/18; 726/2; 726/20; 726/26
(58) Field of Classification Search .......... 726/2, 16–20, 726/26–28
See application file for complete search history.

(56) References Cited

U.S. PATENT DOCUMENTS

| 6,374,356 | B1 | 4/2002 | Daigneault et al. |
| 6,422,463 | B1 | 7/2002 | Flink |
| 6,567,915 | B1 * | 5/2003 | Guthery ........................ 713/168 |
| 7,917,647 | B2 * | 3/2011 | Cooper et al. ................. 709/233 |
| 2004/0162985 | A1 * | 8/2004 | Freeman et al. .............. 713/176 |
| 2004/0249772 | A1 * | 12/2004 | Manson ........................... 706/13 |
| 2005/0182971 | A1 * | 8/2005 | Ong et al. ...................... 713/202 |
| 2007/0250915 | A1 * | 10/2007 | Thibadeau ......................... 726/5 |

OTHER PUBLICATIONS

Rudell, R.L. and Sangiovanni-Vincentelli, A, Multiple-Valued Minimization for PLA Optimization, Sep. 1987, Volume: 6 , Issue: 5, pp. 727-750.*

Honeywell, Star II, Star II Controller with MIRO Options, Sep. 2005, pp. 104, Oak Creek, WI.

Nexwatch, The NexSentry Star II Access Control Unit User Guide, Revision B, Part #660058, May 31, 2002, pp. 1-386.

* cited by examiner

*Primary Examiner* — Michael Simitoski
*Assistant Examiner* — Ali Shayanfar
(74) *Attorney, Agent, or Firm* — Husch Blackwell

(57) ABSTRACT

A method and apparatus are provided for controlling access to a secure area. The method includes the steps of providing a plurality of user credentials, generating a Boolean equation based upon the plurality of user credentials where the generated Boolean equation provides a predetermined response to each user credential of the plurality of credentials, saving the generated Boolean equation in a memory in place of the user credentials and recognizing a user credential of the plurality of user credentials by reference to the Boolean equation.

20 Claims, 3 Drawing Sheets

METHOD AND APPARATUS FOR MAXIMIZING CAPACITY OF ACCESS CONTROLLERS

FIELD OF THE INVENTION

The field of the invention relates to access controllers and more particularly to methods of saving user credentials in access controllers.

FIELD OF THE INVENTION

Access controllers are well known. Such devices can act as a barrier to physical entry or as a barrier to information access. Access controllers for physical access may be used in homes, offices or factories to prevent entry by unauthorized persons, by industrial spies or criminals and to ensure the right people are allowed to enter at the right places during the right time. Access in such cases may be gained by the presentation of badges or other identification cards presented to a reader controlled by a reader access controller.

In some cases, a user may be asked to present their badge or identification card to a guard who may then grant access. However, in most cases, a user may simply pass the badge or identification card through or over a card reader.

The card may be read optically or magnetically. Reading typically involves the retrieval of a numeric or alpha-numeric sequence (user credential) from the magnetic strip or bar code on the card.

Upon retrieval of the user credential, the card reader may send the user credential to a connected access controller where the user credential is compared with a set of authorized user credentials within a database. If a match can be found, then the user is granted access. In not, then the user is refused access.

While such systems are effective, they are dependent upon the proper operation of the card reader and of the access controller. If the card reader or access controller should malfunction or the connection between the card reader and access controller is lost, then access may be denied resulting in lost time.

Alternatively, if the access system should involve many authorized users and card readers, then access may involve sorting through a multitude of different user credentials before any particular credential may be found. Alternatively if many different card readers are active at any one time, then access may be delayed for the same reasons. Because of the importance of access to secure areas, better methods are needed to authenticating user credentials.

DETAILED DESCRIPTION OF AN ILLUSTRATED EMBODIMENT

Figure 1:
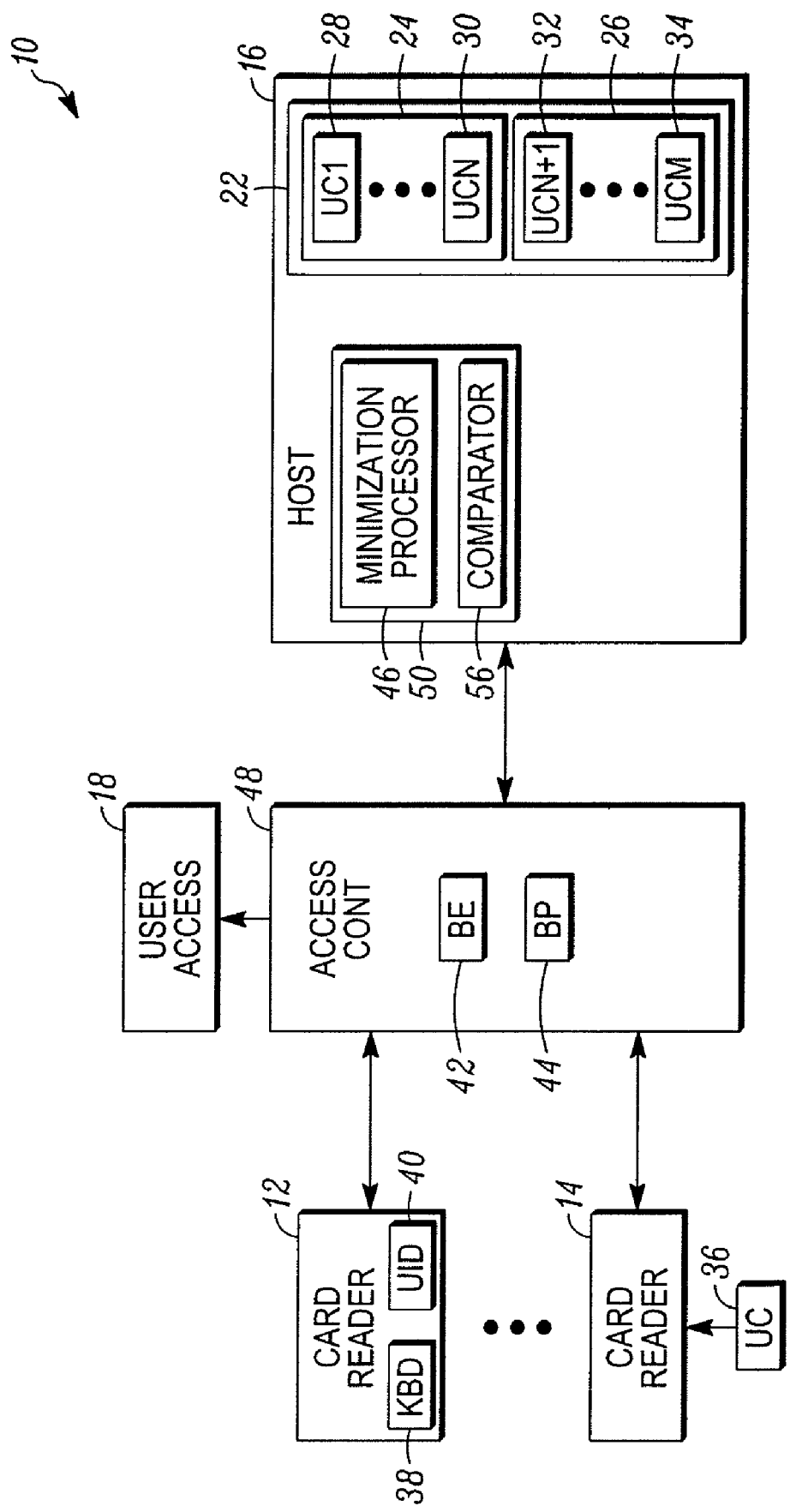
FIG. 1 is a block diagram of a user access system in accordance with an illustrated embodiment of the invention.

FIG. 1 depicts a simplified block diagram of a user access control system 10 shown generally in accordance with an illustrated embodiment of the invention. Included within the access system 10 may be a number of card reader systems 12, 14 and an access control host computer 16. Each card reader system 12, 14 may include the card reader 20 and have a user access device 18 associated to it.

The access control system 10 includes an access controller 48 which controls the card reader system 12, 14. The host software 50 within the host 16 is used for configuring and monitoring the controller 48. A database 52 of credentials is maintained in the access controller 48 so as to make it self dependent in making access decisions. This architecture of having the database 52 in the controller 48 speeds up the access decisions and it can make decisions even when there is no communication with the host software 50. User credentials that are added/modified/deleted in the host software 50 are downloaded to the controller 48, so that both the controller 48 and host software 50 are in synchronism.

The database 52 of each access controller 48 may include fixed flash memory to store configuration data, credentials and events. The access controllers 48 may store a portion of the credentials in the plain number format (e.g., a sequence of numbers) although the credentials could be stored as a sequence of alpha-numeric characters. This makes credential database occupy a significant portion of the flash memory in the controller 48 and it limits the number of events that can be buffered in the controller 48. If there is a requirement from a customer to increase the credential capacity or events buffer, the best available option may be to replace the existing controller with a new controller with larger physical flash memory. The system 10 addresses the need to increase the capacity of access controllers without hardware replacement.

The card reader 20 of each card reader system 12, 14 may include an optical reader (e.g., a bar code reader), a magnetic reader (e.g., a magnetic strip reader) or a radio frequency reader (e.g., for RFID tags). The user access device 18 may be a device that gives a user physical access to a space (e.g., a solenoid that unlocks a door) or that provides access to a information system (e.g., a computer, database, etc.).

Included within the host 16 may be a memory 22 containing a number of user credentials 28, 30, 32, 34 of authorized users. Users in this case may present a card 36 to the card readers 12, 14 where the card reader 12, 14 may read or otherwise retrieve a user credential 40 from the card 36. Alternatively, a user may enter a user credential 40 through a keypad 38 located on or near the card reader 12, 14.

Rather than relying upon communication with the host 16 to verify user credentials, each card reader 12, 14 may contain a short-hand representation of the user credentials that are authorized to use the card reader 12, 14. Under one illustrated embodiment of the invention, the short-hand representation of the user credentials is a Boolean equation 42 that provides a predetermined output whenever a valid user credential is received from an authorized user and only after receiving a valid user credential from an authorized user.

Under the illustrated embodiment, the Boolean equation 42 may be generated by a minimization processor 46 operating on one or more sets 24, 26 of valid user credentials 28, 30, 32, 34 contained within a memory. The minimization processor may use any of a number of known processes to generate the appropriate Boolean equation (e.g., a Quine McCluskey minimization algorithm, Karnaugh mapping, etc.).

The solution incorporated into the system 10 efficiently stores the user credentials 28, 30, 32, 34 in the controller 48 so that its capacity is increased. Instead of storing the credential and its access levels in plain number format, a shorthand representation (e.g., a Boolean equation) is generated for each reader system 12, 14 based on the credentials accessed/blocked on that particular reader 12, 14. Under one preferred embodiment, the Boolean equation is generated using a Quine McCluskey minimization algorithm. The minimization processor 46 selects either the accessed or blocked credentials for generating the shorthand representation based on whichever is lesser in number so that a minimal Boolean equation is used. The Boolean equation is generated for each reader by the host software 50 whenever a credential or some number of credentials are added/modified/deleted by the user and then downloaded to the controller 48. When a card 36 is swiped at the reader, the user credential 40 is evaluated using the Boolean equation of that particular controller 48 of the reader 12, 14 to provide or deny access. If the substitution results in true value then the user of the card 36 is granted access. If the Boolean equation is generated out of unused user credentials using negative logic, then the result of Boolean evaluation must be complimented in order to grant access.

By using this methodology, the system 10 saves memory space within the controllers 48 by storing only the Boolean equations instead of the entire set of credentials long with their access levels.

Figure 2:
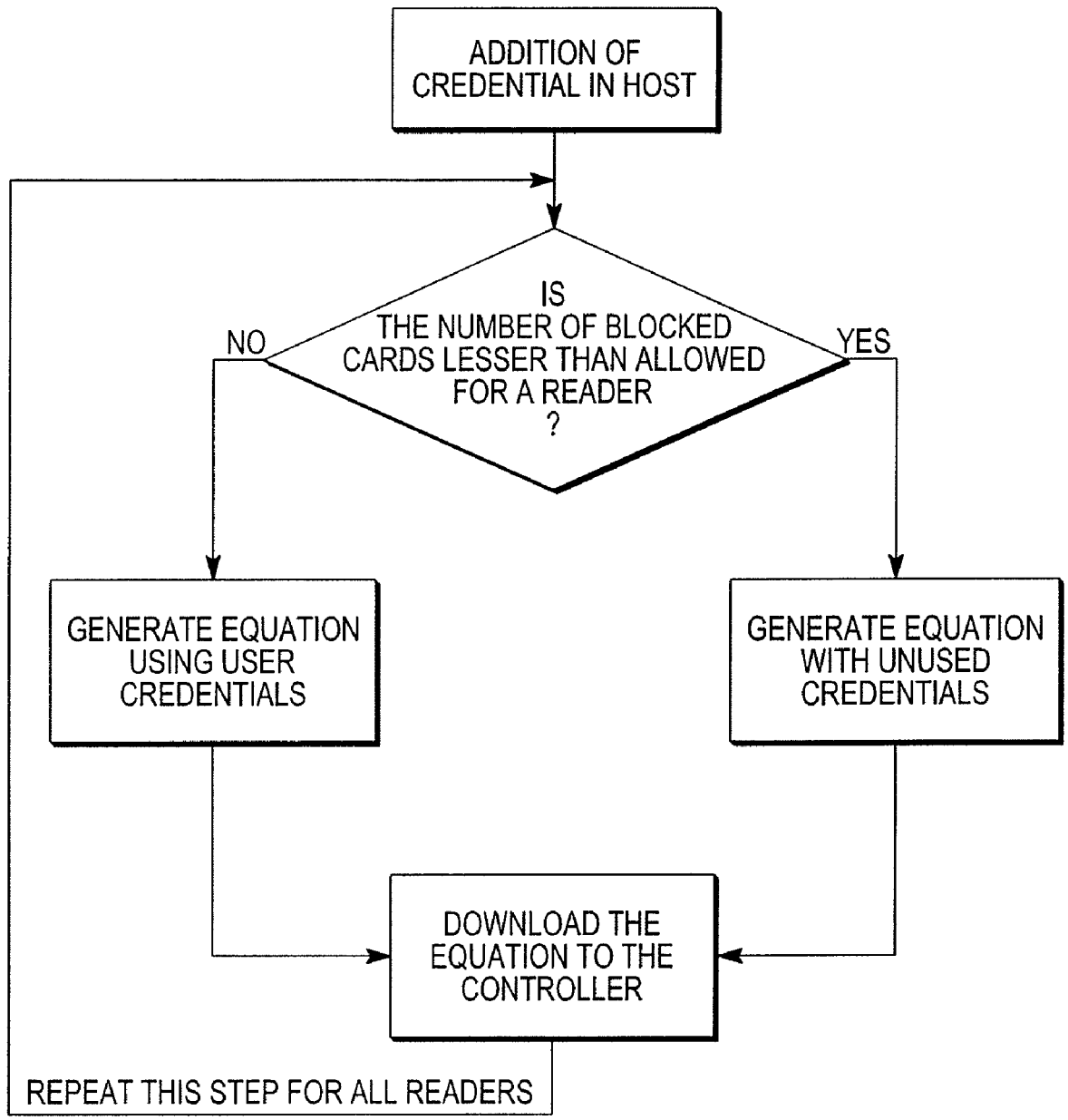
FIG. 2 depicts a set of steps for generating equations used by the system of FIG. 1.

As a very simplistic example of these concepts, consider a user credential domain including three binary bits (a, b and c). Since the user domain include three bits, the user credentials may assume any value from 0 to 7. If two valid user credentials of 2 and 5 exist within this domain, then the Boolean equation may have the form $f(A,B,C)=A'BC'+AB'C$. Since the number of valid user credentials is less than half of the numbers in the domain, positive logic may be used as shown by the left side of FIG. 2. In this case, $f(A,B,C)$ would provide a true value (i.e., $f(A,B,C)=1$) for user credentials of 2 or 5 and a false value (i.e., $f(A,B,C)=0$) for user credentials of 1, 3, 4, 6 or 7. A true value means that the user swiping the card 36 would be granted access.

Continuing with the same example, assume the same user credential domain and that valid user credentials included the numbers 1, 2, 3, 4 and 5. In this case, the unused user credentials require less memory. In this case, the minimization processor 46 may use a comparator 56 to compare the number of user credentials 28, 30, 32, 34 with the number of unused credentials within the domain and generate the Boolean equation based upon the smaller of the two sets of credentials. In this case, the Boolean equation for this situation may have the form $f(A,B,C)=A'B'C+A'B'C'$. Access in this case would be granted when the evaluation produces a false result (i.e., $f(A,B,C)=0$) as shown by the right side of FIG. 2.

A more complex example will be considered next. In this case, it will be assumed that the minimization processor 46 processes valid user credentials 28, 30, 32, 34 using a Quine McCluskey minimization algorithm. The minimization processor 46 in this case may be assumed to operate automatically upon start-up of the system 10 or each time a user credential or a predetermined number of credentials are added, deleted or changed.

Operation of the minimization processor 46 in this case may be segregated by card reader system 12, 14. For example, a first list 24 of user credentials 28, 30 may be associated for a first card reader system 12. Similarly, a second list 26 of user credentials 32, 34 may be associated for a second card reader system 14. In each case, whenever a change is detected to an associated list 24, 26, the minimization processor 46 may process the respective user credentials to identify a minimum size Boolean equation that identifies the respective authorized users and downloads the minimized Boolean equation to the controller 48 with respect to the card reader system 12, 14.

The Quine McCluskey (QM) is a well known minimization algorithm used for generating Boolean equation for a given set of numbers. The QM algorithm may be incorporated into the minimization processor 46 as originally proposed by its authors or may be modified as necessary to accommodate the characteristics of the user access control system 10 including the number of bits within the user authentication system as well as the need to regenerate the Boolean equation following each change to the set of valid user credentials 28, 30, 32, 34.

In general, the generated Boolean equation will return a true value only when a number belonging to the set 24, 26 is substituted or provided as an input to the equation. When some other number is substituted in the Boolean equation it returns a false value. The minimization processor 46 may perform a predefined series of steps in the process of generating the minimized Boolean equation out of the given numbers 28, 30, 32, 34. The process may include the steps of finding prime implicants and generating a chart of prime implicants.

To illustrate the process, another example may be provided. In this case, assume that the system 10 uses positive logic, that the user domain includes four binary bits A, B, C and D and that valid user credentials include the numbers 0, 1, 2, 5, 6, 7, 8, 9, 10, 14. To generate a Boolean equation using QM minimization, the minimization processor 46 first identifies the prime implicants and then generates a chart of prime implicants. On applying the steps of the QM algorithm to the given set of user credentials, the minimization processor 46 may generate the Boolean equation $f(A,B,C,D)=A'BD+CD'+B'C'$. If a user credential "8" were provided as an input (i.e., $A=1, B=0, C=0, D=0$) in the above equation, then the equation would return a true value of 1. If a user credential of "3" were used (i.e., $A=0, B=0, C=1, D=1$), then the equation would return a false value of 0. In the same way if the minimization processor 46 were used to generate an equation for credentials allowed on each particular reader 12, 14, only valid credentials will result in a positive output of 1 if substituted in the equation and for all the other credentials the result would be 0.

In the above example, the ten value user credentials (0, 1, 2, 5, 6, 7, 8, 9, 10, 14) would require 4 bits each. As a result, the total space required to store the above numbers would be $10*4=40$ bits. Each term in the equation generated by the minimization processor 46 using QM would occupy only 4 bits, so the total space occupied by the equation of this example would be $3*4=12$ bits.

A more realistic example may be provided next. In this example, it may be assumed that the user credential domain has 32 bits and that each valid user credential also has 32 bits. It may also be assumed that each valid user credential supports four access levels and that the number of readers 12, 14 supported by host 16 is 16.

Table 1 provides a comparison of memory usage that compares storing user credentials as numbers and storing user credentials in the form of Boolean equations. The first column of Table 1 shows the number of user credentials. The second column shows the memory utilization in bytes if the user credentials were stored as numbers. The third column shows the number of implicants for the number of credentials and the last column shows the memory usage where the user credentials are saved as a Boolean equation.

TABLE 1

| No of Credentials | Current Memory Utilization (In Bytes) | Coefficients/ Implicants | Proposed Memory Utilization (In Bytes) |
|---|---|---|---|
| 100 | 800 | 8 | 512 |
| 200 | 1600 | 9 | 576 |

TABLE 1-continued

| No of Credentials | Current Memory Utilization (In Bytes) | Coefficients/ Implicants | Proposed Memory Utilization (In Bytes) |
|---|---|---|---|
| 300 | 2400 | 10 | 640 |
| 400 | 3200 | 11 | 704 |
| 500 | 4000 | 12 | 768 |
| 600 | 4800 | 11 | 704 |
| 700 | 5600 | 11 | 704 |
| 800 | 6400 | 11 | 704 |
| 900 | 7200 | 12 | 768 |
| 1000 | 8000 | 13 | 804 |

Each credential requires 8 bytes storage space in this example, so the current memory utilization would be the number of credentials*8 bytes (e.g., the first row of 100 credentials would require 800 bytes). The coefficients implies the number of terms in the Boolean equation. There would be 16 such equations since the number of readers supported by controller is 16. The proposed memory utilization of the system 10 is the number of coefficients*16*4 bytes. Table 1 shows the reduction in memory space of the system 10 would be around 90%

Figure 3:
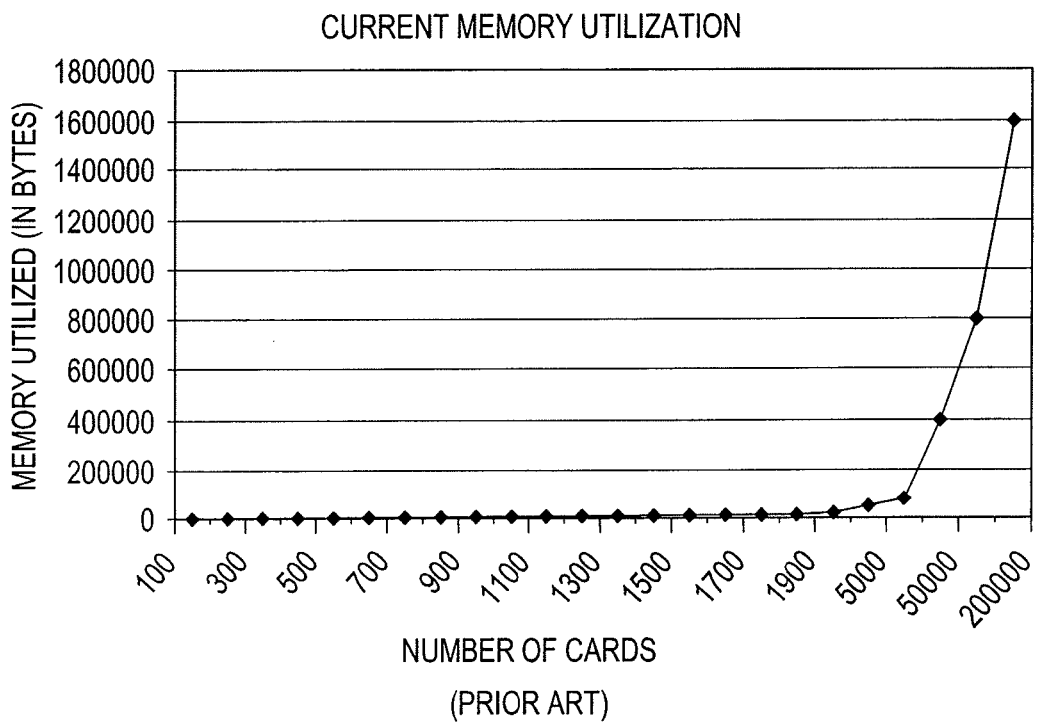
FIG. 3 depicts memory utilization by a prior art user access system.
Figure 4:
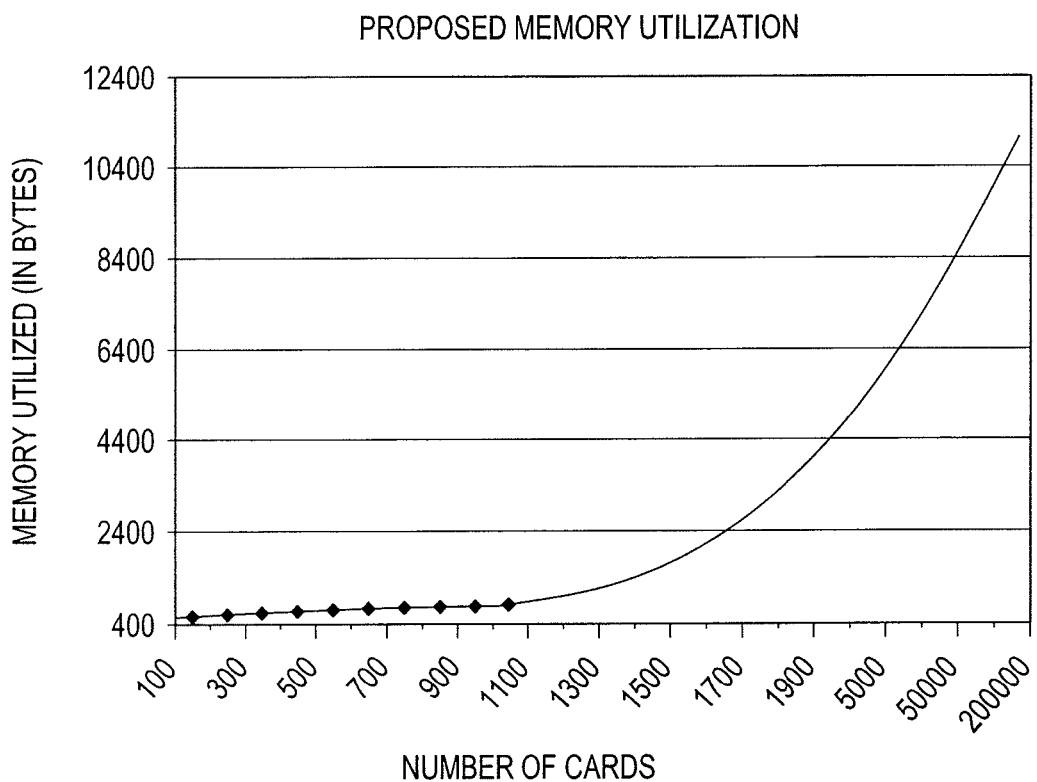
FIG. 4 depicts memory utilization by the system of FIG. 1.

FIG. 3 shows memory utilization using prior art methods. FIG. 4 shows memory utilization using the system 10. From FIG. 3 and it can be seen that that the prior art memory utilization requires 800 KB of memory for 100,000 credentials and the memory utilization of the system 10 requires around 10 KB of memory for 100,000 credentials.

A specific embodiment of method and apparatus for storing user credentials has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of controlling access to a secure area comprising:
   providing a respective credential for each of a plurality of users seeking access to the secure area, the respective credentials each having a corresponding bit value for each of a plurality of bit positions;
   a minimization processor generating a single Boolean equation for the plurality of users based upon the corresponding bit values of each of the plurality of bit positions from each of the plurality of user credentials where the generated Boolean equation provides a predetermined response to each user credential of the plurality of credentials and only after receiving the user credential;
   saving the generated Boolean equation in a memory in place of the user credentials; and
   an access controller recognizing a user credential of the plurality of user credentials by reference to the Boolean equation.

2. The method of controlling access as in claim 1 wherein the step of generating the Boolean equation further comprises applying a Quine McCluskey minimization algorithm to the plurality of user credentials.

3. The method of controlling access as in claim 1 wherein the step of generating the Boolean equation further comprises using Karnaugh mapping.

4. The method of controlling access as in claim 1 further comprising identifying a plurality of unused credentials within a domain of the plurality of user credentials.

5. The method of controlling access as in claim 4 further comprising defining the user credentials and unused credentials as a sequence of alpha-numeric characters.

6. The method of controlling access as in claim 5 wherein the step of generating the Boolean equation further comprises using the plurality of user credentials to generate the Boolean equation and, otherwise, using the unused credentials to generate the Boolean equation when the unused credentials have a smaller relative number.

7. The method of controlling access as in claim 6 wherein the step of generating the Boolean equation further comprises defining a set of variables within the Boolean equation where each variable of the set of variables corresponds to a character of the sequence of apha-numeric characters.

8. The method of controlling access as in claim 1 further comprising regenerating the Boolean equation to add or delete user credentials.

9. An apparatus for controlling access to a secure area comprising:
   a respective user credential for each of a plurality of users seeking access to the secure area, the respective user credentials each having a corresponding bit value for each of a plurality of bit positions;
   a minimization processor that generates a single Boolean equation for the plurality of users based upon the corresponding bit values of each of the plurality of bit positions from each of the plurality of user credentials where the generated Boolean equation provides a predetermined response to each user credential of the plurality of credentials and only after receiving the user credential where the generated Boolean equation is saved in memory in place of the user credentials; and
   a card reader that recognizes a user credential of the plurality of user credentials by reference to the Boolean equation.

10. The apparatus for controlling access as in claim 9 wherein the minimization processor further comprises a Quine McCluskey minimization algorithm.

11. The apparatus for controlling access as in claim 9 wherein the minimization processor further comprises a Karnaugh mapping process.

12. The apparatus for controlling access as in claim 9 further comprising a plurality of unused credentials identified within a domain of the plurality of user credentials.

13. The apparatus for controlling access as in claim 12 further wherein the user credentials and unused credentials further comprise a sequence of alpha-numeric characters.

14. The apparatus for controlling access as in claim 13 wherein the minimization processor further comprises a comparator that determines whether the plurality of user credentials or the unused credentials is used to generate the Boolean equation depending upon which has a smaller relative number of entries.

15. An apparatus for controlling access to a secure area comprising:
   a respective user credential for each of a plurality of users seeking access to the secure area, the respective user credentials each having a corresponding bit value for each of a plurality of bit positions;
   a minimization processor that generates a single Boolean equation for use with the plurality of users, the single Boolean equation is generated from the plurality of user credentials based upon the corresponding bit values of each of the plurality of bit positions from each of the plurality of user credentials; and a card reader that recognizes a user credential of the plurality of user credentials by reference to the Boolean equation.

16. The apparatus for controlling access to a secure area as in claim 15 further comprising the minimization processor that generates the Boolean equation based upon the plurality of user credentials where the generated Boolean equation provides a predetermined response to each user credential of the plurality of credentials where the generated Boolean equation is saved in memory in place of the user credentials.

17. The apparatus for controlling access as in claim 16 wherein the minimization processor further comprises a Quine McCluskey minimization algorithm.

18. The apparatus for controlling access as in claim 16 wherein the minimization processor further comprises a Karnaugh mapping process.

19. The apparatus for controlling access as in claim 16 further comprising a plurality of unused credentials identified within a domain of the plurality of user credentials.

20. The apparatus for controlling access as in claim 16 wherein the minimization processor further comprises a comparator that determines whether the plurality of user credentials or the unused credentials is used to generate the Boolean equation depending upon which has a smaller relative number of entries.

* * * * *